(12) United States Patent
Wang et al.

(10) Patent No.: US 7,021,222 B2
(45) Date of Patent: Apr. 4, 2006

(54) COAL-BURNING BOILER'S IGNITION BURNER

(76) Inventors: Aisheng Wang, Room 501, Unit 1, No. 53, Danyang District, Economical & Technological Development Area, Yantai, Shandong 264006 (CN); Dong Tian, Room 501, Unit 1, No. 53, Danyang District, Economical & Technological Development Area, Yantai, Shandong 264006 (CN)

( * ) Notice: Subject to any disclaimer, the term of this patent is extended or adjusted under 35 U.S.C. 154(b) by 0 days.

(21) Appl. No.: 10/487,970

(22) PCT Filed: Aug. 26, 2002

(86) PCT No.: PCT/CN02/00593

§ 371 (c)(1),
(2), (4) Date: Sep. 20, 2004

(87) PCT Pub. No.: WO03/019079

PCT Pub. Date: Mar. 6, 2003

(65) Prior Publication Data

US 2005/0028712 A1    Feb. 10, 2005

(30) Foreign Application Priority Data

Aug. 27, 2001 (CN) .............................. 01259539 U

(51) Int. Cl.
*F23D 1/00* (2006.01)

(52) U.S. Cl. ..................................... 110/265
(58) Field of Classification Search .................. 431/8, 431/9, 10; 110/265
See application file for complete search history.

(56) References Cited

U.S. PATENT DOCUMENTS

| | | | | | |
|---|---|---|---|---|---|
| 4,054,028 A | * | 10/1977 | Kawaguchi | ................ | 60/39.23 |
| 4,951,581 A | * | 8/1990 | Wiest | ......................... | 110/262 |
| 5,647,739 A | * | 7/1997 | McDonald | ................... | 431/352 |
| 6,116,171 A | * | 9/2000 | Oota et al. | ................... | 110/263 |

FOREIGN PATENT DOCUMENTS

CN            1201878 A        12/1998

(Continued)

*Primary Examiner*—Kenneth Rinehart
(74) *Attorney, Agent, or Firm*—Christie, Parker & Hale, LLP

(57) ABSTRACT

The present application disclosed an ignition and burning apparatus used in a coal boiler, comprising a pulverized coal burner and one or more combustion-enhancing miniature oil guns inserted in the pulverized coal burner, wherein the miniature oil gun comprises a first air supplying cylinder, an atomizing nozzle positioned in the first air supplying cylinder, an oil burner at a lower end of the atomizing nozzle, an ignition device adjacent to the oil burner and an air intake communicating with the first air supplying cylinder, wherein the pulverized coal burner comprises a cooling air cylinder, an air intake communicating with the cooling air cylinder, an expansion channel supported in the cooling air cylinder by a support, cooling structures surrounding the expansion channel, an external nozzle at one end of the expansion channel and a second air supplying cylinder adjacent to the miniature oil gun and communicating with the expansion channel. During the combustion of the pulverized coal, a certain amount of dry steam may be added for generating carbon monoxide and hydrogen for further enhancing the combustion of the pulverized coal. The ignition and burning apparatus used in coal boiler according to the present invention may save more than 90% of oil and demonstrates excellent economic performance.

12 Claims, 2 Drawing Sheets

FOREIGN PATENT DOCUMENTS

| | | |
|---|---|---|
| CN | 2325646 Y | 6/1999 |
| CN | 2337408 Y | 9/1999 |
| CN | 2371445 Y | 3/2000 |
| JP | 8-226615 | 9/1996 |

* cited by examiner

A-A

COAL-BURNING BOILER'S IGNITION BURNER

CROSS-REFERENCE TO RELATED APPLICATION

This application is a National Phase Patent Application of International Application No. PCT/CN02/00593, filed on Aug. 26, 2002, which claims priority of Chinese Patent Application Number 01259539.x, filed on Aug. 27, 2001.

BACKGROUND OF THE INVENTION

1. Technical Field

The present invention relates to an ignition and burning apparatus used in coal boiler.

2. Background Art

The starting ignition and low-load stable combustion of the conventional industrial coal boiler will consume a great amount of burning oil. For example, in the year of 1999, the electric power industry of China consumed about 13.65 million tons of oil. Research and development of pre-combustion chamber have been conducted since more than ten years, and great success has been made in the technique of multi-fuel combustion of coal and oil near the nozzle of the pulverized coal burner by means of a miniature oil gun. The oil-saving effect of said technique is prominent. However, so far, there is no combustion-enhancing miniature oil gun and combustion-enhancing pulverized coal burner having the function of internal combustion of pulverized coal. Consequently, the oil-saving effect is limited and the economic performance of the electric power industry is affected adversely.

SUMMARY OF THE INVENTION

Therefore, an object of the invention is to provide an ignition and burning apparatus used in coal boiler and capable of saving oil considerably.

Said object is realized by the following ignition and burning apparatus used in coal boiler. An ignition and burning apparatus used in coal boiler, comprises a pulverized coal burner and one or more combustion-enhancing miniature oil guns inserted in the pulverized coal burner, wherein the miniature oil gun comprises a first air supplying cylinder, an atomizing nozzle positioned in the first air supplying cylinder, an oil burner at a lower end of the atomizing nozzle, an ignition device adjacent to the oil burner and an air intake communicating with the first air supplying cylinder, wherein the pulverized coal burner comprises a cooling air cylinder, an air intake communicating with the cooling air cylinder, an expansion channel supported in the cooling air cylinder by a support, cooling structures surrounding the expansion channel, an external nozzle at one end of the expansion channel and a second air supplying cylinder adjacent to the miniature oil gun and communicating with the expansion channel.

In the ignition and burning apparatus used in coal boiler of the present invention, the pulverized coal in the burner is fired by the combustion-enhancing miniature oil gun, and in turn, the pulverized coal boiler is started by the heat generated by the enhanced combustion of the pulverized coal boiler and enters into a stable combustion state. As a result, a great amount of oil, up to more than 90%, may be saved and the economic performance is excellent.

BRIEF DESCRIPTION OF THE DRAWINGS

The preferred embodiments of the present invention will be discussed in details with reference to the accompanying drawings, in which.

DETAILED DESCRIPTION OF THE INVENTION

Now the preferred embodiment of the present invention will be described in details with reference to the accompanying drawings.

Figures 1, 2:
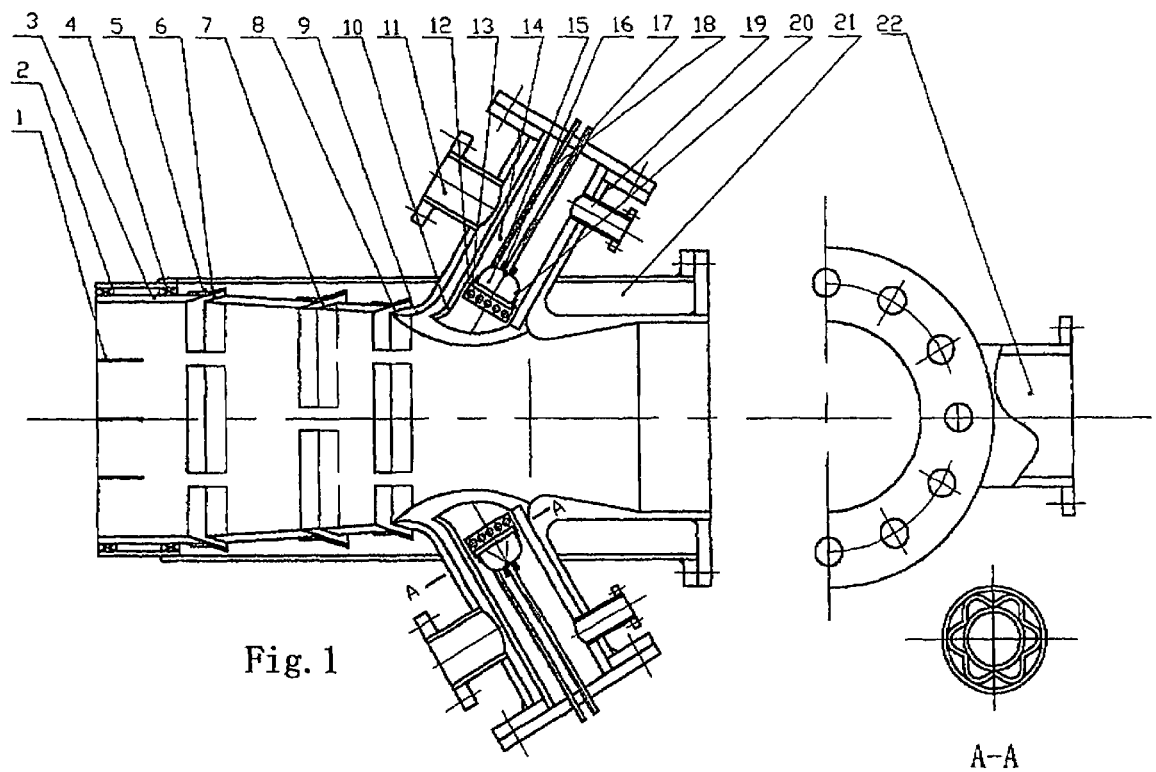
FIG. 1 is a diagram illustrating the structure of an ignition and burning apparatus used in a coal boiler according to one embodiment of the present invention.
FIG. 2 is a sectional view along the A—A line in FIG. 1.

As shown in FIG. 1, the ignition and burning apparatus used in coal boiler comprises one or more miniature oil guns 14 and a pulverized coal burner 3, wherein the miniature oil gun 14 comprises an atomizing nozzle 17, an oil burner 15, an ignition device 18, first air supplying cylinders 10, and an air intake 19. The pulverized coal burner 3 comprises a multi-stage window-type air film cooling ring, an air intake 22, an expansion channel 1, a support 4, an external nozzle 2, a cooling jacket 5, a cooling air cylinder 21 and a second air-supplying cylinder 11. Above parts are assembled together by means of bonding and/or screw fastening.

Figure 4:
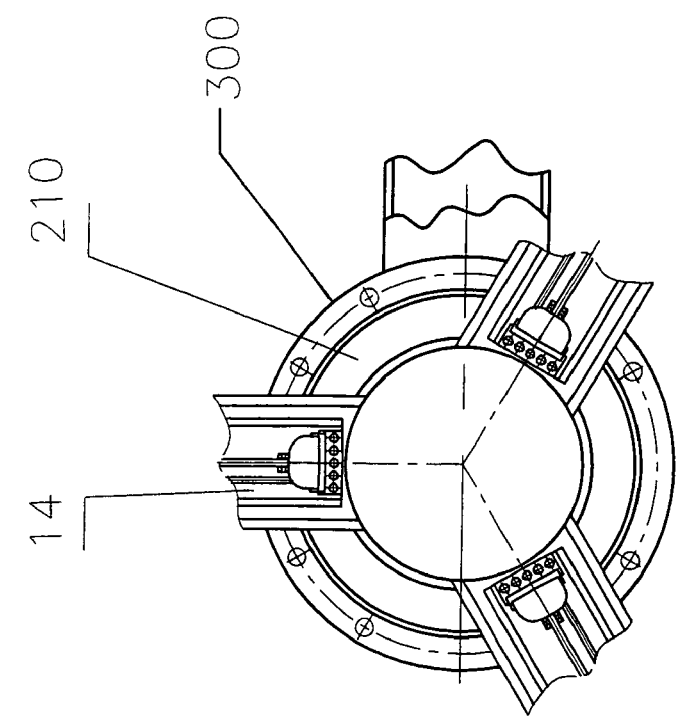
FIG. 4 is a schematic left view of a third embodiment of the ignition and burning apparatus used in a coal boiler according to the invention.
Figure 3:
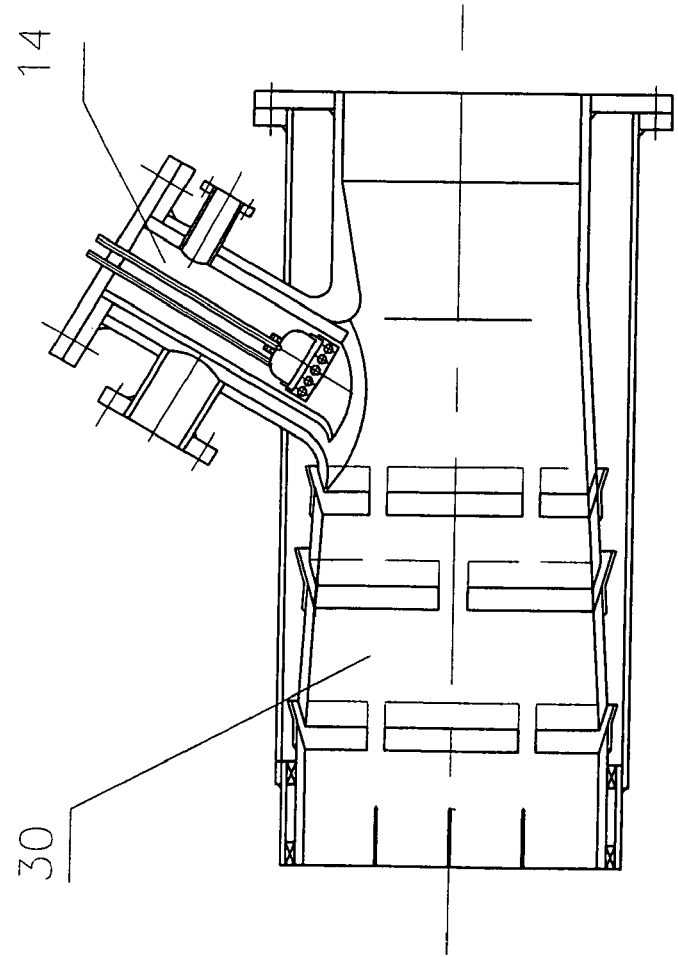
FIG. 3 is a schematic view of another embodiment of the ignition and burning apparatus used in a coal boiler according to the invention.

The miniature oil gun may be aligned in line with the pulverized coal burner, or may make an angle with the latter. Specifically, there may be only one miniature oil gun, which dips with respect to the pulverized coal burner 3. Alternatively, the miniature oil gun may be inserted into the pulverized coal burner in the axial direction at the bending portion(s) of the tubes. Alternatively, there may be more than one miniature oil gun, which may be arranged symmetrically about and inclined with respect to the pulverized coal burner. The embodiment shown in FIG. 1 comprises two miniature oil guns arranged symmetrically about and inclined with respect to the pulverized coal burner. FIG. 3 shows schematically a pulverized coal burner 30 with one single miniature oil gun inserted therein and dipping with respect to it. FIG. 4, a left view (viewing from the left of FIG. 1 or 3), shows schematically a pulverized coal burner 300 with three miniature oil guns arranged symmetrically about and inclined with respect to the pulverized coal burner.

The atomizing nozzle 17 of the miniature oil gun 14 may adopt mechanical atomization, vapor atomization or air atomization.

As a preferred embodiment, a cooling gap may be provided between the first air-supplying cylinder 10 of the miniature oil gun 14 and the outer surface of the oil burner 15.

Said oil burner 15 may comprises a cyclone 16, a corrugated sheet cooler 13, deep oxygen-adding holes 12 and a housing 20.

The number and angle of the whirl plates of the cyclone 16 and the size and number of the deep oxygen-adding holes 12 may be selected depending on the whirling force and the flow rate. As a preferred embodiment, the cyclone 16 has 6–16 whirl plates with angle of 30–60 degrees.

Said multi-stage window-type air film cooling rings, such as the first cooling ring 6, the second cooling ring 7 and the third cooling ring 8, and the cooling jacket 5, constitute the cooling structure of the pulverized coal burner 3. The cooling structure of the pulverized coal burner 3 may also be of the same structure as the corrugated sheet air film cooling structure adopted in the oil burner 15 of the miniature oil gun 14.

In the following, the operation of the ignition and burning apparatus used in coal burner will be described with reference to the accompanying drawings, according to preferred embodiments of the present invention.

For starting the boiler, the ignition device is started first. When the atomizing nozzle 17 spays atomized light oil, the ignition device generates electric sparks, which fire the light oil. The pressurized air in the air supplying cylinder 10 is divided into three flows: one passes the cyclone 16 of the miniature oil gun 14 into the oil burner 15 to establish a stable flame region therein; another passes via the peripheral region of the cyclone into the oil burner 15 to participate in after-burning; a portion of the third flow passes via the deep oxygen-adding holes 12 into the oil burner 15 to participate in oxygen-added enhanced combustion; and the other portion of the third flow passes through the inner and outer corrugated gap of the multi-stage corrugated sheet cooler 13 onto the inner wall of the oil burner to establish a high-speed air film for protecting the wall of the burning cylinder from shock of high temperature. Said other portion participates in the combustion after cooling the inner and outer walls of the oil burner 15.

The miniature oil gun with enhanced combustion generates a high temperature flame with temperature as high as 1400–1600 degrees Celsius. The flame, always surrounded by the air film formed by the multi-stage corrugated gas film cooler, entered into the pulverized coal burner 3. When rushing into the pulverized coal burner 3, the flame of the miniature oil gun 14 ignites the pulverized coal therein. Also, in the pulverized coal burner 3 is(are) provided with multi-stage window type air film cooler(s), by means of which the pressurized air coming from the cooling air channel 21, 210 cools the inner wall surface of the burner, so that coking in and damages to the burner due to the burning are prevented.

Depending on the operating condition, air or dry steam may be introduced via the air intake 11 of the pulverized coal burner 3 to improve the enhanced combustion of the pulverized coal. High temperature coal particles, mixed with the dry steam introduced via the air intake 11, generate carbon monoxide and hydrogen with high heat value:

(a) 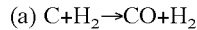$C+H_2 \rightarrow CO+H_2$

Thus the combustion of the pulverized coal is enhanced.

When the start of the whole boiler has been completed, the miniature oil gun is shut down, the pulverized coal passes through the tube from right to left and into the combustion chamber. A normal starting procedure is thus completed.

Owing to adopting the miniature oil gun for enhancing combustion, the resulted high-temperature flame has heat of up to 2 million kilocalories and facilitates greatly the ignition of large volume of pulverized coal, including lean coal and hard coal. For example, conventionally, cold starting of the boiler of a generator of 0.3 million kW will consume 100 tons of diesel oil. When adopting the present invention, the consumed oil will be not more than 6 tons. That is, 94% of oil is saved, and the invention has excellent economic performance.

Another advantage of the invention is, if there is existing oil systems, the workload for converting the system is low and the cost is low. Moreover, the miniature oil gun needs less maintenance and the structure thereof is simple and reliable.

The invention claimed is:

1. An ignition and burning apparatus used in a coal boiler, comprising a pulverized coal burner (3) and one or more miniature oil guns (14) inserted in the pulverized coal burner, wherein the miniature oil gun (14) comprises a first air supplying cylinder (10), an atomizing nozzle (17) positioned in the first air supplying cylinder, an oil burner (15) at a lower end of the atomizing nozzle, an ignition device (18) adjacent to the oil burner and an air intake (19) communicating with the first air supplying cylinder (10), wherein the pulverized coal burner (3) comprises a cooling air cylinder (21), an air intake (22) communicating with the cooling air cylinder (21), an expansion channel (1) supported in the cooling air cylinder (21) by a support (4), cooling structures surrounding the expansion channel, an external nozzle (2) at one end of the expansion channel and a second air supplying cylinder (11) adjacent to the miniature oil gun and communicating with the expansion channel; characterized in that said oil burner (15) comprises a cyclone (16), a corrugated sheet cooler (13), deep oxygen-adding holes (12) and a housing (20).

2. The ignition and burning apparatus used in the coal boiler of claim 1, characterized in that the cyclone (16) has 6–16 whirl plates with angles of 30–60 degrees.

3. The ignition and burning apparatus used in the coal boiler of claim 1, characterized in that the size and number of the deep oxygen-adding holes (12) are selected depending on the whirling force and the flow rate.

4. The ignition and burning apparatus used in the coal boiler of claim 1, characterized in that the cooling structure of the pulverized coal burner (3) comprises multi-stage window-type air film cooling rings and a cooling jacket (5).

5. The ignition and burning apparatus used in the coal boiler of claim 1, characterized in that the atomizing nozzle (17) of the miniature oil gun (14) adopts mechanical atomization.

6. The ignition and burning apparatus used in the coal boiler of claim 1, characterized in that the atomizing nozzle (17) of the miniature oil gun (14) adopts vapor atomization.

7. The ignition and burning apparatus used in the coal boiler of claim 1, characterized in that the atomizing nozzle (17) of the miniature oil gun (14) adopts air atomization.

8. The ignition and burning apparatus used in the coal boiler of claim 1, characterized in that, the miniature oil gun(s) (14) is(are) inserted into the pulverized coal burner in the axial direction at the bending portion(s) of the pulverized-coal-feeding tubes.

9. The ignition and burning apparatus used in the coal boiler of claim 1, characterized in that, there are two or more miniature oil guns (14), which are arranged symmetrical about and inclined with respect to the pulverized coal burner (3).

10. An ignition and burning apparatus used in coal boiler, comprising a pulverized coal burner (3) and one or more miniature oil guns (14) inserted in the pulverized coal burner, wherein the miniature oil gun (14) comprises a first air supplying cylinder (10), an atomizing nozzle (17) positioned in the first air supplying cylinder, an oil burner (15) at a lower end of the atomizing nozzle, an ignition device (18) adjacent to the oil burner and an air intake (19) communicating with the first air supplying cylinder (10), wherein the pulverized coal burner (3) comprises a cooling air cylinder (21), an air intake (22) communicating with the cooling air cylinder (21), an expansion channel (1) supported in the cooling air cylinder (21) by a support (4), cooling structures surrounding the expansion channel, an external nozzle (2) at one end of the expansion channel and a second air supplying cylinder (11) adjacent to the miniature oil gun and communicating with the expansion channel; characterized in that, depending on the operating condition, air or dry steam is introduced via the air intake (11) of the pulverized coal burner (3) to improve the enhanced combustion of the pulverized coal.

11. An ignition and burning apparatus used in a coal boiler, comprising a pulverized coal burner (30) and one or more miniature oil guns (14) inserted in the pulverized coal burner, wherein the miniature oil gun (14) comprises a first air supplying cylinder (10), an atomizing nozzle (17) positioned in the first air supplying cylinder, an oil burner (15) at a lower end of the atomizing nozzle, an ignition device (18) adjacent to the oil burner and an air intake (19) communicating with the first air supplying cylinder (10), wherein the pulverized coal burner (30) comprises a cooling air cylinder (21), an air intake (22) communicating with the cooling air cylinder (21), an expansion channel (1) supported in the cooling air cylinder (21) by a support (4), cooling structures surrounding the expansion channel, an external nozzle (2) at one end of the expansion channel and a second air supplying cylinder (11) adjacent to the miniature oil gun and communicating with the expansion channel; characterized in that, there is only one miniature oil gun, which dips with respect to the pulverized coal burner (30).

12. An ignition and burning apparatus used in a coal boiler, comprising a pulverized coal burner (3) and one or more miniature oil guns (14) inserted in the pulverized coal burner, wherein the miniature oil gun (14) comprises a first air supplying cylinder (10), an atomizing nozzle (17) positioned in the first air supplying cylinder, an oil burner (15) at a lower end of the atomizing nozzle, an ignition device (18) adjacent to the oil burner and an air intake (19) communicating with the first air supplying cylinder (10), wherein the pulverized coal burner (3) comprises a cooling air cylinder (21), an air intake (22) communicating with the cooling air cylinder (21), an expansion channel (1) supported in the cooling air cylinder (21) by a support (4), cooling structures surrounding the expansion channel, an external nozzle (2) at one end of the expansion channel and a second air supplying cylinder (11) adjacent to the miniature oil gun and communicating with the expansion channel; characterized in that, a cooling gap is provided between the first air-supplying cylinder (10) of the miniature oil gun (14) and an external surface of the oil burner (15).

* * * * *

UNITED STATES PATENT AND TRADEMARK OFFICE
CERTIFICATE OF CORRECTION

PATENT NO.         : 7,021,222 B2
APPLICATION NO.    : 10/487970
DATED              : April 4, 2006
INVENTOR(S)        : Wang et al.

Page 1 of 1

It is certified that error appears in the above-identified patent and that said Letters Patent is hereby corrected as shown below:

On the Title Page

(54) Title & Col. 1 line 1    Delete "COAL-BURNING BOILER'S IGNITION BURNER", Insert --IGNITION AND BURNING APPARATUS USED IN COAL BOILER--

(56) References Cited
Other Publications            Insert --International Search Report of PCT/CN02/00593, dated 12-19-2002--

Signed and Sealed this

Twenty-eighth Day of August, 2007

JON W. DUDAS
*Director of the United States Patent and Trademark Office*